UNITED STATES PATENT OFFICE.

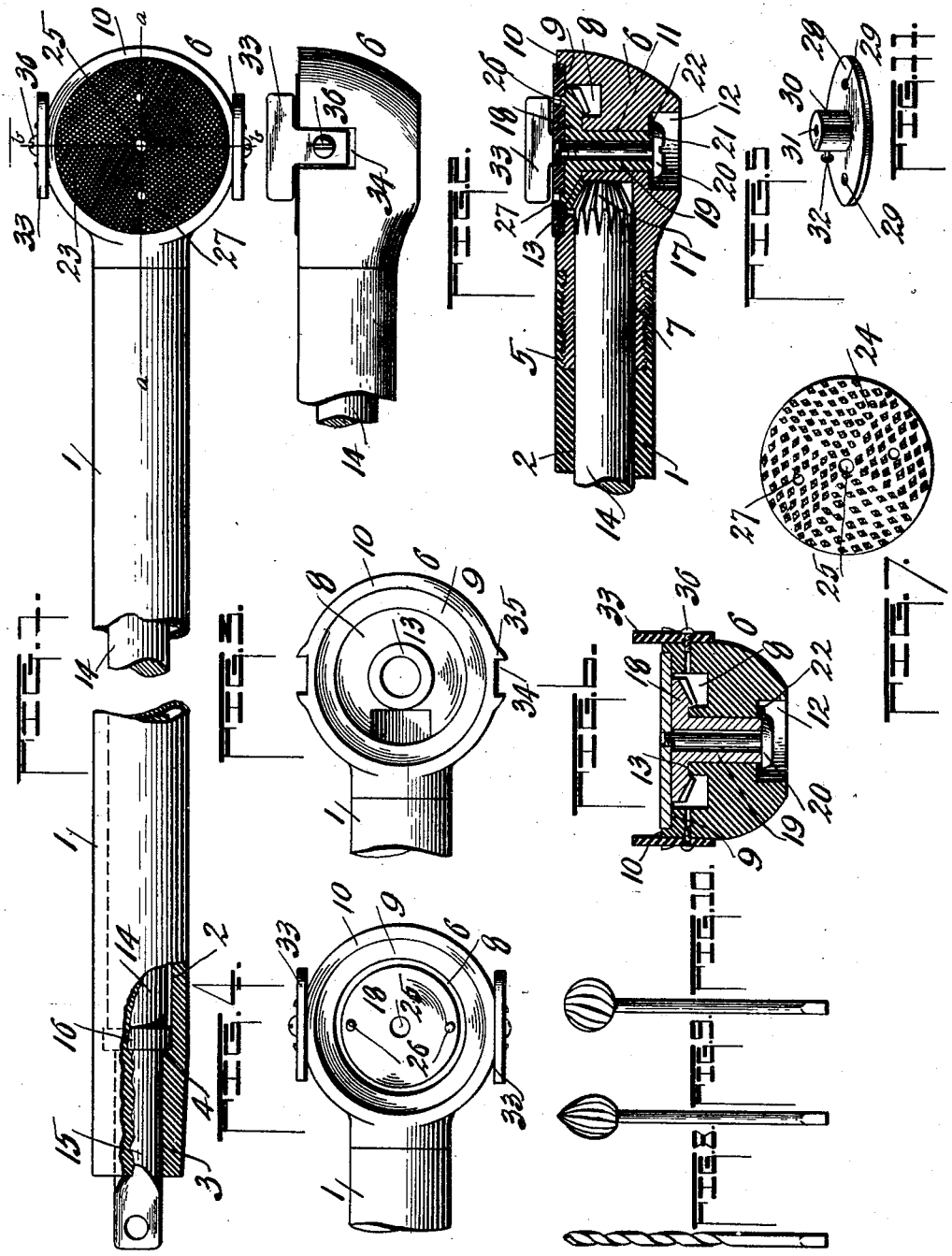

GARNET J. REED AND ALBERT MEIERHOFER, OF MINONK, ILLINOIS.

VETERINARY DENTAL INSTRUMENT.

No. 925,379.　　　Specification of Letters Patent.　　　Patented June 15, 1909.

Application filed June 3, 1907. Serial No. 376,930.

*To all whom it may concern:*

Be it known that we, GARNET J. REED and ALBERT MEIERHOFER, citizens of the United States, residing at Minonk, in the county of Woodford and State of Illinois, have invented certain new and useful Improvements in Veterinary Dental Instruments; and we do hereby declare that the following is a full, clear, and exact description of the invention, which will enable others skilled in the art to which it appertains to make and use the same.

This invention has reference to certain new and useful improvements in veterinary dental instruments and is of that type of apparatus shown and described in the patent issued to us on June 20th, 1905, and numbered 792,666.

One of the objects which we have in view is to simplify and improve the construction illustrated in the above patent, to provide for interchangeably connecting with said implement, files, rasps, or other suitable leveling devices and drills or augers of various types; also in the provision of guards suitably secured to the head of the implement upon opposite sides of the operating means.

For a further and full description of the invention herein and the merits thereof, and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:

Figure 1 is a plan view of our improved implement, partially broken away and partially in section and showing attached to the operating means, a circular file; Fig. 2 is a detail side elevation of the head portion of the implement shown in Fig. 1; Fig. 3 is a plan view of the head end of the implement with the guards, and operating mechanism removed; Fig. 4 is a view similar to Fig. 3 except that the guards are shown attached to the head and a bevel gear attached, is shown in position; Fig. 5 is a vertical longitudinal section of the implement as the same would appear if taken on the line *a—a* of Fig. 1; Fig. 6 is a transverse section of the implement as the same would appear if taken on the line *b—b* of Fig. 1; Fig. 7 is a face view of a form of rasp, which may be substituted for the circular file, shown in Fig. 1; Fig. 8 is a form of auger drill which may be substituted for the file of Fig. 1, or the rasp of Fig. 7, designed to be detachably connected with the plate shown in Fig. 11; Fig. 9 is a form of "bud bur" which may be substituted for either the file, rasp, or auger drill and is adapted to have a detachable connection with the plate shown in Fig. 11; Fig. 10 is a form of "round bur" which may be substituted for the file, rasp, auger drill or "bud bur" and is adapted to have a detachable connection with the plate shown in Fig. 11, and Fig. 11 is a perspective of a plate designed to have a detachable connection with a gear of the head of the implement, and to which the tools, 8, 9, and 10 may be connected.

Like numerals of reference indicate corresponding parts throughout the figures.

The implement, as the same is herein illustrated, consists of an elongated tubular handle 1, the bore 2 of which, at its outer end is reduced as at 3, to form a shoulder 4, and the inner end is enlarged for a short distance and threaded as at 5. A head, which is indicated as 6, is provided with a tubular stem 7, externally threaded and adapted to be screwed into the threaded end of the handle 1, as shown in Fig. 5; the tubular opening through the stem coinciding with and being of substantially the same diameter as the bore 2 in said handle, and the inner end of the tubular opening of said head merges into an annular groove 8 cut into said head in which a bevel gear is rotatably mounted which meshes with a gear on a stem operatively carried in the handle, to be described. The head 6 is open on that side in which the annular groove 8 is formed, and the face portion upon the open side thereof, is provided with a shoulder 9 which may form a bearing for circular disks, such as files, or rasps, which may be rotatably supported on the said head, the same being held against lateral displacement by means of the annular flange 10, the manner of supporting the disks as aforesaid, being further described. And extending transversely through the body of the head is a tubular opening 11, which preferably serves as a bearing in manner to be described, and its lower end communicates with an enlarged opening or recess 12, which is formed in the bottom of the head, said bearing 11 at its upper end is in the form of an annular shoulder 13, on which the bevel gear, to which references was above made, is rotatably mounted.

14 denotes an operating stem which is carried in the handle portion 1, the longer portion of said stem fitting that portion of the handle provided with the enlarged bore 2, and the outer end of the stem, is reduced in diameter as shown at 15 and passes through that portion of the handle provided with the reduced bore 2, and projects beyond the end of said handle as shown in Fig. 1, to adapt the connection therewith, of some suitable power, preferably a flexible shaft, (not shown). And the said stem is provided with a flange 16 which has a bearing against the shoulder portion 4 of the handle, as shown in Fig. 1. The parts as above described, necessitate the placing of the stem 14 in the handle portion 1 by inserting the same into said handle from the inner end, this owing to the reduced construction in the outer end of the handle and constructing the stem to conform thereto. The inner end of the stem 14 has cut thereon the bevel gear 17 which projects through the tubular stem portion 7 of the head 6, and operates in the annular groove 8 cut in said head. We prefer to cut the gear 17 on the stem 14 but it is understood that such a construction may be dispensed with and a gear similar to what is shown as 17, may be attached to the inner end of the stem 14.

18 denotes a bevel gear which is provided with an elongated tubular hub portion 19, the opening in which extends through the body of the gear and said hub is suitably journaled in the tubular bearing 11 formed in said head. The displacement and arrangement of such parts being best seen in Fig. 5, wherein the bevel gear 18 is shown in mesh with the bevel gear 17 on the end of the stem 14; and for retaining the parts in the relative positions shown in Fig. 5, we employ a cap-screw 20 which is inserted into the head through the opening or recess 12 therein and the threaded portion of the cap-screw passes through the opening into the hub and body of the gear 18; although there is no direct connection between the threaded portion of the cap-screw and said bevel gear, as the threaded end of the cap-screw projects up beyond the upper flat face of the bevel gear 18 and is designed to have a threaded engagement with a circular file, circular rasp, or any suitable abrading disk, or a plate, such as is shown in Fig. 11, the outer portions of said file, rasp, abrading disk or plate having engagement with the shoulder portion 9 of the head 6. As soon as the cap-screw is released sufficiently to disconnect the same from the circular file, or other tool, as aforesaid, the gear 8 may be disconnected from the head. The outer end of the hub portion 19 of the bevel gear 18 projects into the opening or recess 12 of the head and is provided with a flat face 21 by means of which a washer 22, with which the head of the cap-screw engages, is locked on the hub of the gear.

In the construction of the implement, such as shown in the patent above referred to, it was necessary to provide two cap-screws for securing the tool to the bevel gear, and it was found necessary to employ a binding plate for locking the parts together. However, this has been obviated in the present construction, and we have also done away with the binding plate or any similar part which would produce an off-set or projection on the lower surface of the head which is undesirable, and a construction to be avoided, particularly in the use in which it is designed to employ such an implement, and by a construction of the bevel gear 18 such as will be described, we are enabled to interchangeably connect with such gear, various forms of tools for operating upon the teeth of horses and other animals.

In Fig. 1 a circular file is indicated as 23; in Fig. 7 there is shown a circular rasp indicated as 24 and the said file and rasp are provided with central openings 25 which are internally threaded and with which the threaded end of the cap-screw 20 is designed to have engagement for locking the tools, such as the file or rasp to the bevel gear 18, in the manner shown in Fig. 5; and as an additional means for securing the file or rasp to the bevel gear, the said gear is provided with a pair of studs 26 which are adapted to be inserted into openings 27 formed in the said file or rasp. Said file or rasp may have an interchangeable connection in this manner with the gear 18, and the outer portion thereof resting on the shoulder 9 of the head and revolving within the annular flange 10, the abrading surface of said file or rasp project up beyond the surface of the head, as best seen in Figs. 5 and 6.

In Fig. 11 is shown a plate or disk which is indicated as 28, which may be preferably of the same diameter as the file or rasp for the purpose of attaching the same in like manner as the file and rasp to the head of the implement and provided with openings 29 into which the lugs 26 of the gear 18 may be inserted; thus, the plate or disk 28 may be interchanged for a file or rasp when it is desired to attach some other form of tool, such as those shown in Figs. 8, 9 and 10, to the operating parts of said implement. The plate or disk 28 is preferably formed with a boss 30 with an opening 31 extending therethrough and through the body of the plate or disk, its lower end suitably enlarged and threaded (although not shown), whereby the threaded end of the cap-screw 20 may have engagement therewith and that portion of the opening 31 which extends through the boss 30 of the plate is such as to have detachably connected therewith, an auger drill of Fig. 8, the "bud bur" of Fig. 9, the "round bur" of Fig. 10, or some similar tool, by inserting the lower end thereof into the opening in the boss and locking the same in position by means of the screw 32, see Fig. 11.

For the purpose of preventing the head of the implement from becoming displaced when operating upon the teeth of a horse or other animal by reason of the same moving off the teeth, owing to the rotary motion, which is being imparted to the operating parts in the head end of said implement, we have provided suitable guard-plates which may be detachably connected upon opposite sides of said head and extending beyond the plane of the abrading surface of the files, or rasps, when such are used, such guards also serving to protect the cheeks and tongue of the animal from coming in contact with the file or rasp when the same is in operation. Such guards are indicated as 33, which are preferably T shaped, the shank or lower portion of which is preferably seated within a recess 34 providing side walls 35 which prevent the displacement of said guards, and the same are secured to the head 6 by means of the screws 36. The upper and acting portions of said guards being that portion which are disposed above the upper acting face of the head and are preferably in alinement with the handle 1, as shown.

Having thus fully described our invention, what we claim and desire to secure by Letters Patent of the United States, is:—

1. In a veterinary implement, the combination of a driving part, a member geared to said driving part and rotatable in a plane opposite to the plane of rotation of said driving part, a plate having a detachable connection with said member, and means for attaching a tool to said plate.

2. In a veterinary implement, the combination of a driving part, extending longitudinally of said implement, a gear operatively connected with said driving part and having a transverse bearing of said implement, a plate adapted to be attached to said gear, means for attaching the plate to the gear and thereby retaining the gear in operative relation with said driving part, and means for attaching a tool to said plate.

3. In a veterinary implement, the combination of a driving part extending longitudinally of said implement, a gear operatively connected to said driving part having a transverse bearing in said implement, lugs projecting from the said gear, a plate adapted to be connected to said gear and provided with a central threaded opening and perforations in the body of the plate into which the lugs of the gear may be inserted, means for securing the gear in operative relation with the driving part and having connections with the threaded opening in the plate, and means for attaching a tool to said plate.

4. In a veterinary implement, the combination of an elongated tubular handle, a head provided with a stem having a threaded connection with said handle and said head provided with a transverse bearing communicating with a recess on one side of said head and an enlarged circular opening upon the opposite side thereof, a stem operatively mounted in said handle and projecting into said head, a gear attached to the inner end of said stem, a second gear in mesh with the gear of the stem and having a hub journaled in the transverse bearing of the head, and a cap screw for connecting a tool with said second gear, and for retaining the gear in operative relation with said stem, the head of said cap screw being seated and inclosed within the recess aforesaid of the head.

5. In a veterinary implement, the combination of a driving part, a gear operatively connected to said driving part, a plate provided with a boss having a central opening which extends through the body of the plate, means for attaching the plate to the gear, and means for securing a tool in the boss of said plate.

6. In a veterinary implement, the combination of an elongated tubular handle internally threaded at one end, a head having an externally threaded portion for connection with the threads of the handle, a driving part operatively connected with said handle and extending in said head, a gear having a transverse bearing in the head and operatively connected with the driving part, means for securing a tool to said gear, said means also capable of retaining the gear in operative relation with the driving part, and guards detachably connected with said head and disposed opposite to each other.

7. In a veterinary implement, the combination of an elongated tubular handle internally threaded at one end, a head having an externally threaded portion for connection with the threads of the handle, and also provided with oppositely recessed portions in the outer face of the head, a driving part operatively connected with said handle and extending in said head, a gear having a transverse bearing in the head and operatively connected with the driving part, means for securing a tool to said gear, said means also capable of retaining the gear in operative relation with the driving part and guards having shank portions adapted to be retained in the oppositely recessed portions of said head.

In testimony whereof we affix our signatures, in presence of two witnesses.

GARNET J. REED.
ALBERT MEIERHOFER.

Witnesses:
CHAS. W. LA PORTE,
J. O. BAILEY.